US012609421B2

(12) United States Patent
Beecher

(10) Patent No.: US 12,609,421 B2
(45) Date of Patent: Apr. 21, 2026

(54) BATTERY TERMINAL MICRO WELDS

(71) Applicant: Rivian IP Holdings, LLC, Plymouth, MI (US)

(72) Inventor: Bryce Fredrick Alexander Beecher, Bloomington, IL (US)

(73) Assignee: Rivian IP Holdings, LLC, Plymouth, MI (US)

( * ) Notice: Subject to any disclaimer, the term of this patent is extended or adjusted under 35 U.S.C. 154(b) by 812 days.

(21) Appl. No.: 17/891,887

(22) Filed: Aug. 19, 2022

(65) Prior Publication Data

US 2023/0087786 A1     Mar. 23, 2023

Related U.S. Application Data

(60) Provisional application No. 63/246,236, filed on Sep. 20, 2021.

(51) Int. Cl.
| | |
|---|---|
| *H01M 50/566* | (2021.01) |
| *H01M 10/04* | (2006.01) |
| *B23K 26/21* | (2014.01) |
| *B23K 101/36* | (2006.01) |

(52) U.S. Cl.
CPC ..... *H01M 50/566* (2021.01); *H01M 10/0422* (2013.01); *B23K 26/21* (2015.10); *B23K 2101/36* (2018.08)

(58) Field of Classification Search
CPC ........................ H01M 50/566; H01M 10/0422
See application file for complete search history.

(56) References Cited

U.S. PATENT DOCUMENTS

| | | |
|---|---|---|
| 2017/0365838 A1 | 12/2017 | Okada et al. |
| 2018/0117714 A1 | 5/2018 | Scherer et al. |
| 2020/0147714 A1 | 5/2020 | Wynn |

FOREIGN PATENT DOCUMENTS

| | | |
|---|---|---|
| CN | 102284826 A | 12/2011 |
| CN | 102906902 A | 1/2013 |
| CN | 106425102 A | 2/2017 |
| CN | 111360408 A | 7/2020 |
| CN | 112570890 A | 3/2021 |
| CN | 113070601 A | 7/2021 |
| JP | 2003-017033 A | 1/2003 |
| JP | 2012-125829 A | 7/2012 |
| WO | 2012/063381 A1 | 5/2012 |

*Primary Examiner* — Jane J Rhee
(74) *Attorney, Agent, or Firm* — HG LAW LLP

(57) ABSTRACT

Example illustrations are directed to methods and apparatuses comprising battery cells having weld joints. In an example method, a laser is moved to a shoulder of a battery cell. The method may further include micro welding with the laser a first line segment on the shoulder of the battery cell and moving the laser a distance on the shoulder of the battery cell. The method may also comprise micro welding with the laser a second line segment on the shoulder of the battery cell in response to moving the laser the distance. Example battery cell assemblies, e.g., for a battery pack, may have a battery cell and a weld joint on a shoulder of the battery cell. The weld joint may include a first micro weld line segment and a second micro weld line segment separated by a distance.

20 Claims, 8 Drawing Sheets

☶ Shoulder Weld First Pass
☵ Shoulder Weld Second Pass

☶ Button Weld First Pass
☵ Button Weld Second Pass

Start

805 — Set n = 1

810 — Determine Position for nth Micro Weld

815 — Move Laser to Position for nth Micro Weld

820 — Weld nth Micro Weld

825 — Weld Joint Complete?

No → 830 — Increment n

Yes → End

800

702

706 — Welding Equipment

710

704 — Processing Circuitry

700

BATTERY TERMINAL MICRO WELDS

CROSS-REFERENCE TO RELATED APPLICATION

This application claims priority to U.S. Provisional Patent Application No. 63/246,236, filed on Sep. 20, 2021, the contents of which are hereby expressly incorporated by reference in their entirety.

INTRODUCTION

The present disclosure relates to systems and methods of manufacturing and assembling battery cell arrays.

SUMMARY

Storing and harnessing significant levels of electrical energy is becoming more important as the use of combustion-based sources of power are transitioned to renewable resources and other resources that are less polluting (e.g., wind, solar, nuclear). Storing energy for applications where there is a high current/voltage demand over extended periods of time (e.g., for powering large/heavy motorized vehicles) may use a large number of battery cells (e.g., thousands) within which to store the energy and an infrastructure for carrying the high levels of power to their destination.

It is important that the connections among the large number of battery cells allow for high-power surges and are consistently manufactured. One technique for electrically connecting components is laser welding, which can be sensitive to variations in process. For example, variations in weld power or intensity, weld speed, etc. can result in incorrect levels of energy being applied to the joint. Where too much energy is applied, welds may over-penetrate a joint. On the other hand, insufficient energy input can fail to adequately join a contact to a substrate. Both situations can reduce efficiency of power transfer to/from battery cells. As a result, there is a need for improved consistency of energy input to a laser weld that reduces incidences of incorrect penetration of the weld joint.

In at least some example approaches, a method comprises moving a laser to a shoulder of a battery cell and micro welding with the laser a first line segment on the shoulder of the battery cell. The method may further comprise moving the laser a distance on the shoulder of the battery cell. The method may also comprise micro welding with the laser a second line segment on the shoulder of the battery cell in response to moving the laser the distance.

In at least some example methods, the distance comprises a predetermined distance, and moving the laser the distance on the shoulder of the battery cell comprises moving the laser the predetermined distance on the shoulder of the battery cell. The method may also further include turning the laser on to micro weld the first line segment, turning the laser off before moving the laser the predetermined distance, and turning the laser on to micro weld the second line segment in response to moving the laser the predetermined distance.

In at least some example illustrations, a method further comprises turning the laser off after micro welding the second line segment, moving the laser a multiple of the predetermined distance from the second line segment in response to turning the laser off, and turning the laser on to micro weld a third line segment in response to moving the laser the multiple of the predetermined distance.

In at least some example methods, moving the laser to the shoulder of the battery cell comprises moving the laser to a first portion of the battery cell to micro-weld the first line segment. Additionally, moving the laser the distance on the shoulder of the battery cell comprises moving the distance to a second portion of the battery cell to micro-weld the second line segment.

In at least some examples, the method further includes moving the laser from the second portion to a third portion of the battery cell and, in response to moving the laser from the second portion to the third portion, micro welding a third line segment.

In at least some example approaches, the second line segment and the third line segment are on opposite lateral sides of the first line segment.

In at least some example illustrations, the first line segment is formed in a center portion of a weld joint.

In at least some examples, the first and second line segments extend in a first direction on the shoulder of the battery cell, and the distance extends in a direction perpendicular to the first line segment.

In at least some example approaches, the first and second line segments create a weld joint between a contact and the shoulder of the battery cell.

In at least some example illustrations, the method also includes forming a first weld-free zone surrounding the first line segment and forming a second weld-free zone surrounding the second line segment.

In at least some example approaches, a length of each of the first line segment and the second line segment is no more than 700 microns.

In at least some examples, the second line segment is parallel to the first line segment.

In at least some example illustrations, the battery is generally cylindrical.

In at least some examples, a battery cell assembly is provided comprising a battery cell, and a weld joint on a shoulder of the battery cell. The weld joint comprises a first micro weld line segment and a second micro weld line segment separated by a distance.

In at least some example approaches, a length of each of the first micro weld line and the second micro weld line is no more than 700 microns.

In at least some example illustrations, the first micro weld line and the second micro weld line are parallel to each other, and the distance is perpendicular to the first micro weld line segment and the second micro weld line segment.

In at least some example approaches, a battery pack comprises a plurality of battery cells and a plurality of weld joints. Each battery cell has one of the weld joints on a shoulder of the battery cell, respectively, with each weld joint comprising a first micro weld line segment and a second micro weld line segment separated by a distance.

In at least some examples, a length of each of the first micro weld line and the second micro weld line is no more than 700 microns.

In at least some example illustrations, the first micro weld line and the second micro weld line are parallel to each other, and the distance is perpendicular to the first micro weld line and the second micro weld line.

In at least some example approaches, the first micro weld line segment of each of the weld joints are arranged parallel to the second micro weld line segment of the weld joint, respectively.

In at least some example approaches, the battery pack further includes a negative electrical contact joined to the battery cells with the weld joints.

BRIEF DESCRIPTION OF THE DRAWINGS

The above and other features of the present disclosure, its nature and various advantages will be more apparent upon consideration of the following detailed description, taken in conjunction with the accompanying drawings in which.

DETAILED DESCRIPTION

Batteries, e.g., for electric vehicles, may employ battery packs with a plurality, and in some cases a large number, e.g., thousands, of battery cells configured to provide electrical energy for propulsion of the vehicle. In example illustrations herein, a plurality of battery cells are electrically tied together by one or more contacts or current collectors. The current collectors may be in electrical communication with one or more busbars. Accordingly, electrical power may be supplied by the battery pack via the contacts, current collectors and busbars. Further, the battery pack may be recharged via the contacts, current collectors and busbars, e.g., by regenerative power developed by the vehicle or by charging station or other external power source. More specifically, positive and negative terminals of the cells may be electrically joined by respective positive and negative contacts. In some example approaches, these electrical contacts may be formed of a relatively thin metallic material, e.g., a foil and/or aluminum material. The contacts may be micro welded to the battery cells, e.g., via laser welding.

Figure 1:
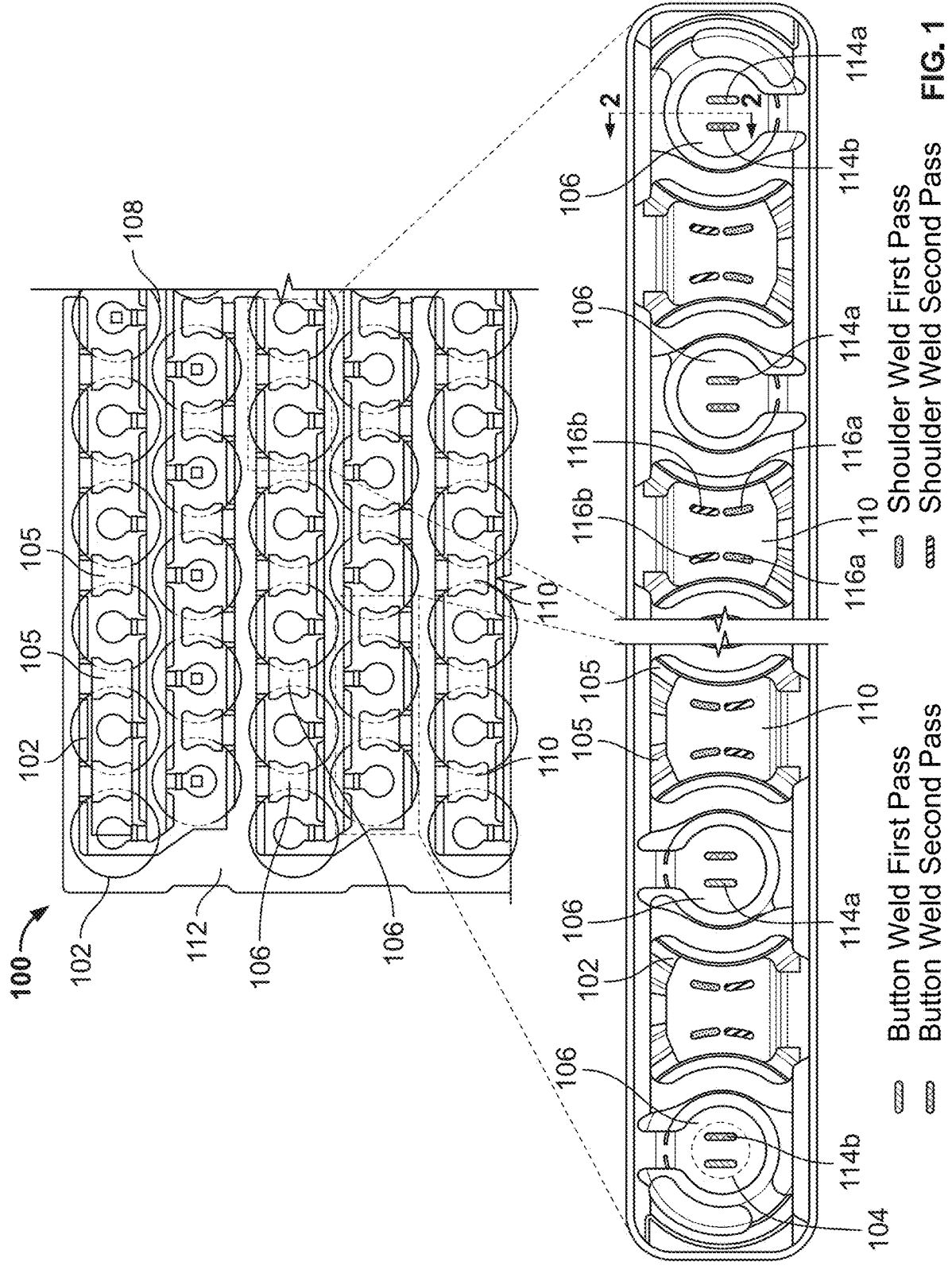
FIG. 1 is an illustrative diagram of an array of battery cells and potential weld sites according to some embodiments of the disclosure.

Referring now to FIG. 1, a portion of an example battery pack 100 is illustrated in plan or top view, with an enlarged portion thereof. The pack 100 includes a plurality of battery cells 102. The cells 102 may be any configuration or type that is convenient. In an example, the cells 102 are cylindrical 2170-type lithium-ion battery cells. In another example, the cells 102 are prismatic-shaped battery cells.

Each of the cells 102 include a positive battery terminal 104, and the pack 100 also includes positive contacts 106 for electrically connecting the positive battery terminal 104 of each cell 102 to a positive current collector 108 of the pack 100. As illustrated, the contacts 106 may have a generally circular tab shape. Additionally, a negative current collector 112 of the pack 100 may include negative contacts 110 for electrically connecting to negative terminals 105 of each of the battery cells 102. As illustrated, the negative contacts 110 may include generally curved sections, e.g., corresponding to the cylindrical shape of cells 102. The positive terminal 104 and the negative terminal 105 may each be any terminal or area of a battery where a positive or negative electrical connection can be made, respectively. The positive contacts 106 and negative contacts 110 may each be any electrical contact where positive or negative electrical connections may be made with the cells 102, respectively, to facilitate electrical communication between the cells 102 and a load or power supply.

The positive terminal 104 and negative terminal 105 of each of the cells may be micro welded to the positive contact 106 and negative contact 110, respectively. In an example, a laser welding process is employed to weld each positive terminal 104 to a respective contact 106 with a plurality of welds applied to create one or more distinct weld joints 114. As illustrated in the example shown in FIG. 1, each of the positive terminals 104 are joined to a single positive contact 106 with two distinct weld joints 114a and 114b (collectively, 114), although any number of weld joints 114 may be used that is convenient. Further, a laser welding process may also be employed to weld the negative terminal 105 of each cell 102 to negative contact(s) 110. More specifically, each of the negative contacts 110 are joined to underlying negative terminals 105 of two adjacent cells 102 with four weld joints 116a and 116b (collectively, 116), with two being applied to each of the adjacent cells 102. Accordingly, the terminals 104 and 105 may each be joined to their respective contacts 106 and 110 via the weld joints 114 and 116, respectively.

Figure 2:
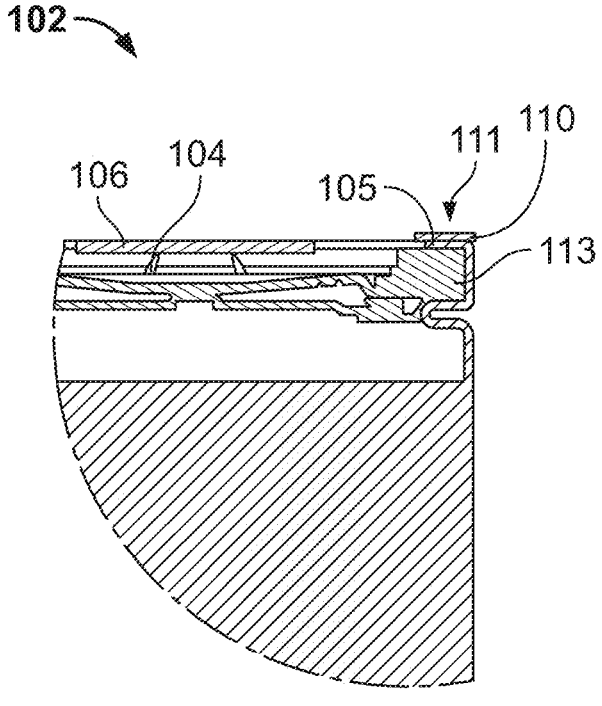
FIG. 2 shows a cross-sectional view of a battery cell and electrical contacts for a battery pack, e.g., as taken through line 2-2 of FIG. 1, in accordance with some embodiments of the present disclosure.

Referring now to FIG. 2, a section view of an upper shoulder 111 of one of the battery cells 102 is illustrated, according to an example approach. While the cells 102 are illustrated as being generally cylindrical, any other shape or configuration of the cells 102 may be employed. Merely as one example, the cells 102 may be prismatic. As noted above, the battery cell 102 comprises a positive terminal 104 at a center of a circular upper surface of the cell 102, and a negative terminal 105 extending circumferentially about the radially outer shoulder area 111. Positive electrical contact 106 may electrically tie together the positive terminals 104 of a plurality of additional battery cells 102 (see FIG. 1). Similarly, the negative electrical contact 110 may electrically tie together the negative terminals 105 of the additional battery cells 102. As noted above, each of the negative terminals 105 may be micro welded to the negative contacts 110, and the positive terminals 104 may be micro welded to the positive contacts 106 with one or more weld joints. As also noted above, in some example approaches laser welding may be employed for the welding of terminals 104 and 105 to electrical contacts 106 and 110, respectively.

In some examples, the shoulder area 111 of the battery cell is relatively narrow in a radial direction, e.g., approximately 700 microns wide. The shoulder area 111 of the battery cell 102 may be formed by a crimped material (along a radially outer edge) that radially encloses a gasket 113, which may provide electrical separation of the negative terminal 105 from the positive terminal 104 at the center/button area of the battery cell 102. The gasket 113 may be formed of an electrically insulative material, e.g., nylon, polypropylene, or polybutylene terephthalate (PBT), merely as examples.

Figure 3A:
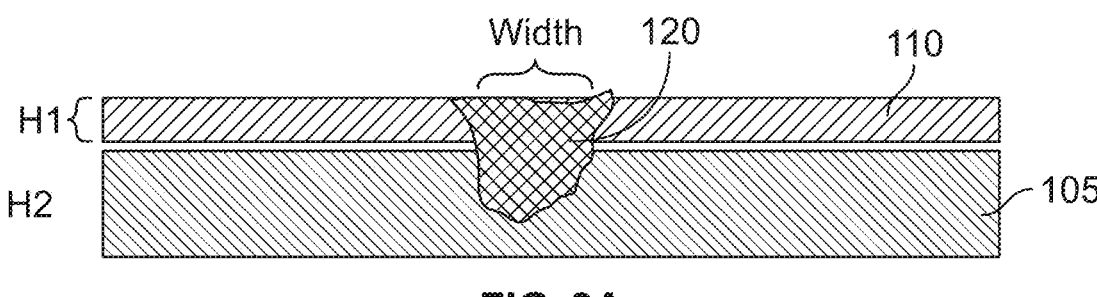
FIG. 3A shows a first cross-sectional view of a weld site between a battery cell substrate and an electrical contact, in accordance with some embodiments of the present disclosure.
Figure 3B:
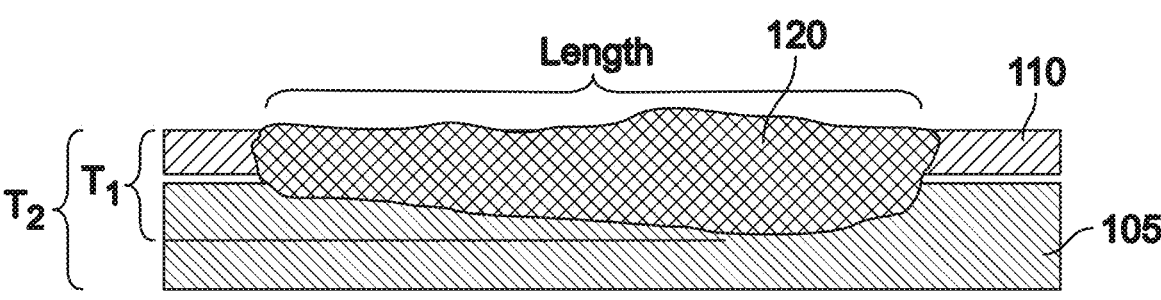
FIG. 3B shows a second cross-sectional view of the weld site of FIG. 2A, taken at a 90-degree angle with respect to the cross-sectional view of FIG. 2A, in accordance with some embodiments of the present disclosure.

Referring now to FIGS. 3A and 3B, an example micro weld 120, e.g., for an electrical contact to a positive or negative terminal of a battery cell, is illustrated in sections taken perpendicular with respect to each other. As will be discussed further below, example weld joints may be formed with a plurality of distinct welds 120 within the zone. Generally, an example micro weld 120 may be formed in a line or line segment, such that a width is substantially smaller than a length of the micro weld 120, as shown in FIGS. 3A and 3B. In example illustrations, an electrical contact, e.g., negative contact 110, may be a superstrate having a relatively small height $H_1$ in comparison to the height $H_2$ of an electrical terminal, e.g., negative terminal 105, forming a terminal substrate of the weld joint. In an example, the electrical contact/superstrate 110 may be formed of a 125 um-thick aluminum material (e.g., 3003-series aluminum), while the terminal 105 forming the substrate and thereby forming a terminal substrate, is a 250 um-thick nickel-plated steel material. Further, the micro welds 120 each penetrate the terminal substrate 105 of the battery without penetrating beyond a maximum thickness of the terminal 105. Put another way, as illustrated in FIG. 3B the micro welds 120 have a weld depth $T_1$ in the terminal 105 that is less than a maximum thickness $T_2$ of the terminal 105 forming the substrate of the micro weld 120.

Referring again to FIGS. 1 and 2, as illustrated, in some example approaches a first pass of a laser welding process may be initiated over the positive terminals 104 of the cells 102 and their respective positive contacts 106, thereby joining the positive electrical contact 106 to underlying positive terminals 104 of the battery cells 102 along a first weld joint 114a of each. Subsequently, a second pass of the laser may be passed over the positive electrical contacts 106, thereby forming a second weld joint 114b joining the positive electrical contact 106 to underlying positive terminals 104 of the battery cells.

As also illustrated, in some example approaches a first pass of a laser welding process may be initiated over the negative electrical contacts 110, thereby joining the negative electrical contacts 110 to underlying negative terminals 105 of the battery cells 102 to form a first plurality of weld joints 116a. Subsequently, a second pass of the laser weld may be initiated over the negative electrical contacts 110, thereby forming weld joints 116b joining the negative electrical contact 110 to underlying negative terminals 105 of the battery cells 102. As will be discussed further below, each of the weld joints 116a and 116b may have a plurality of micro welds 120. Furthermore, in at least some example approaches the weld joints 114a and 114b of the positive electrical contacts 106 to the positive terminals 104 may also each comprise a plurality of micro welds 120.

While any number and configuration of welds 120 and weld joints 114/116 may be employed that is convenient, in the illustrated example each of the positive terminals 104 is joined to a respective tab of the positive contact 106 with two separate weld joints 114, while each of the negative terminals 105 is joined to respective negative contacts 110 with four separate weld joints 116.

Figure 4:
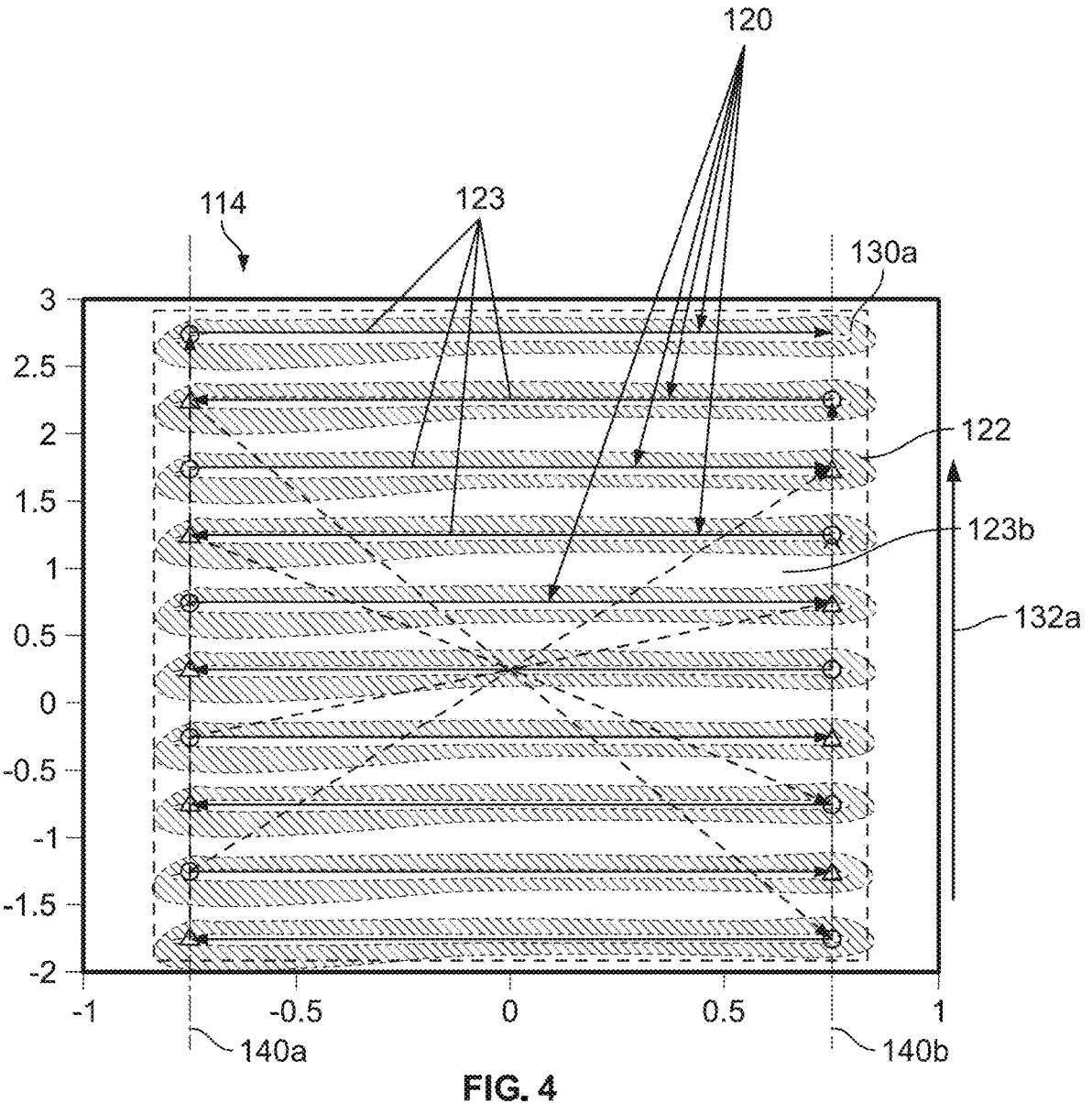
FIG. 4 is a top view of a weld for a battery cell and contact, according to some embodiments of the disclosure.
Figure 5:
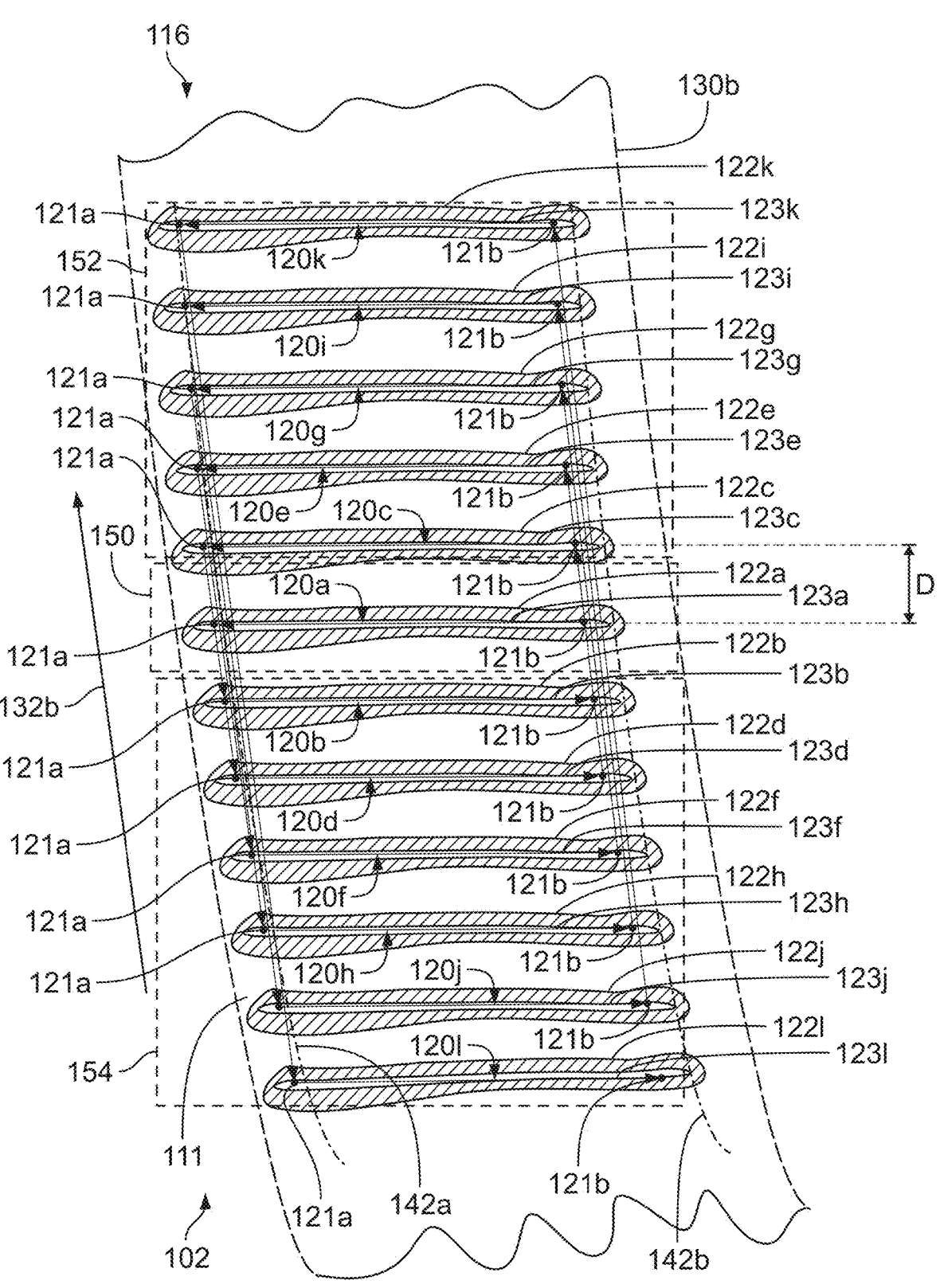
FIG. 5 is a top view of another weld for a battery cell and contact, according to some embodiments of the disclosure.
Figure 6A:
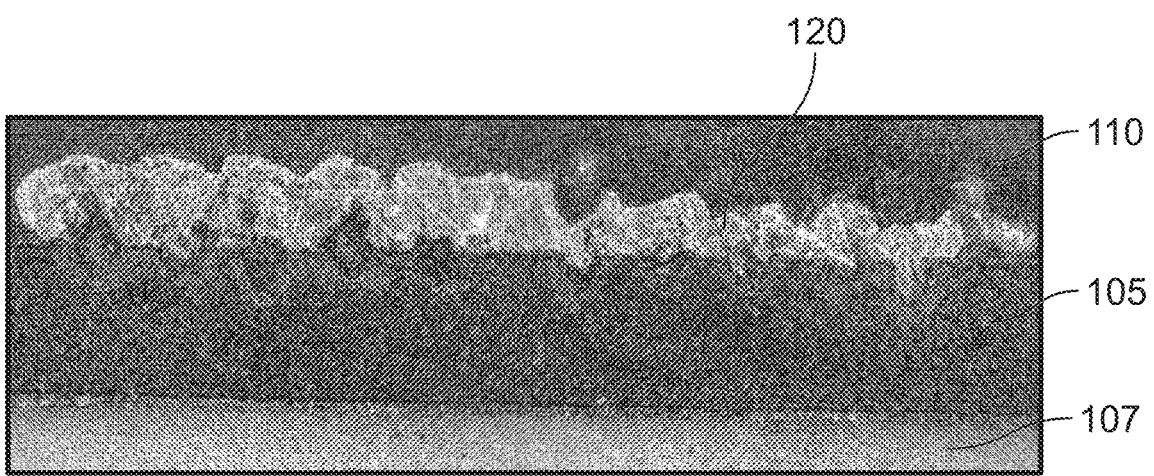
FIGS. 6A-6I are each cross-sectional views of completed weld joints between a substrate of a battery cell and an electrical contact that has been sectioned, according to some embodiments of the disclosure.
Figure 6B:
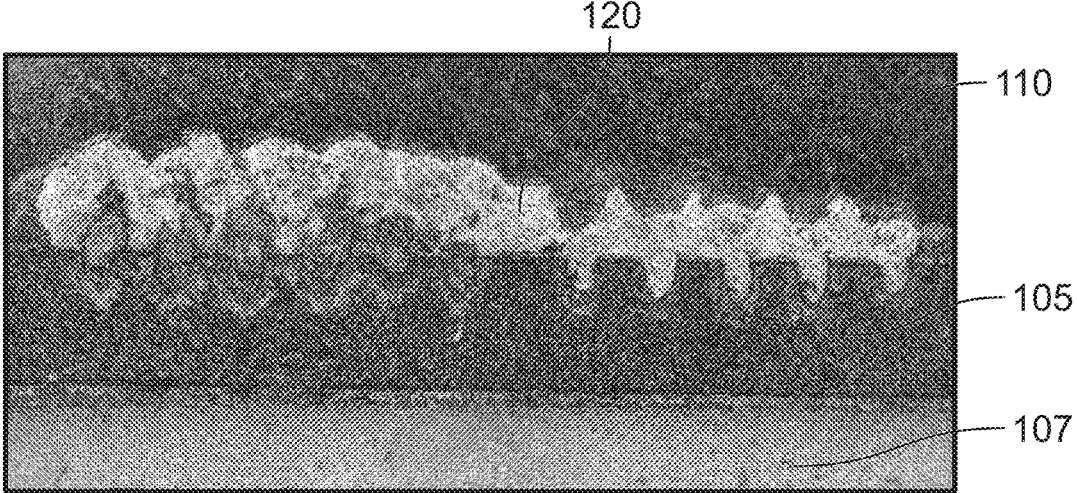
Figure 6C:
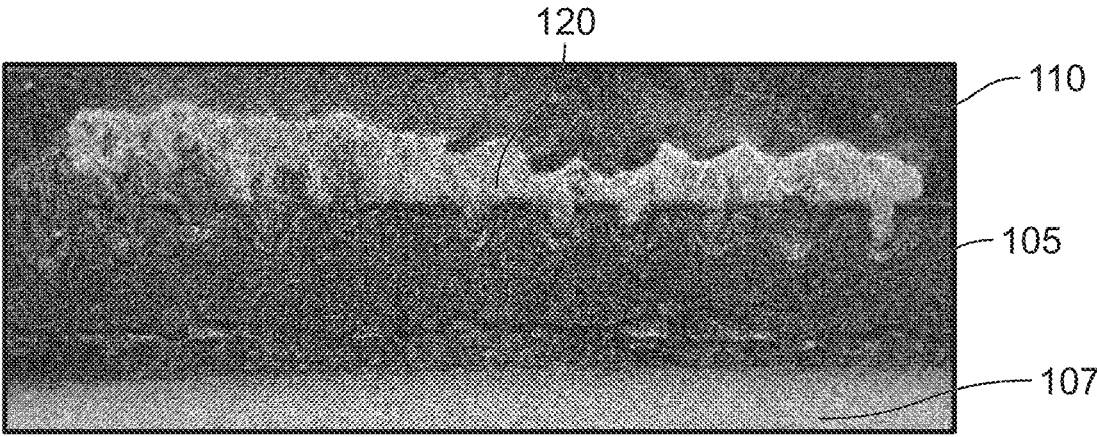
Figure 6D:
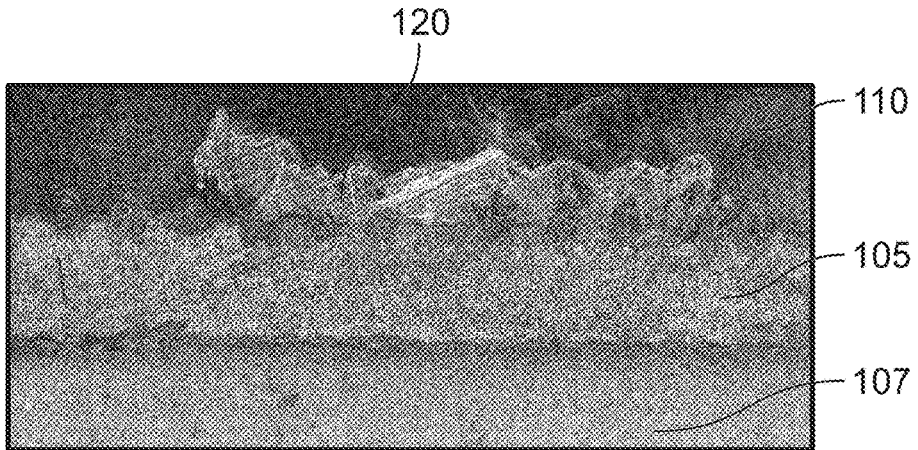
Figure 6E:
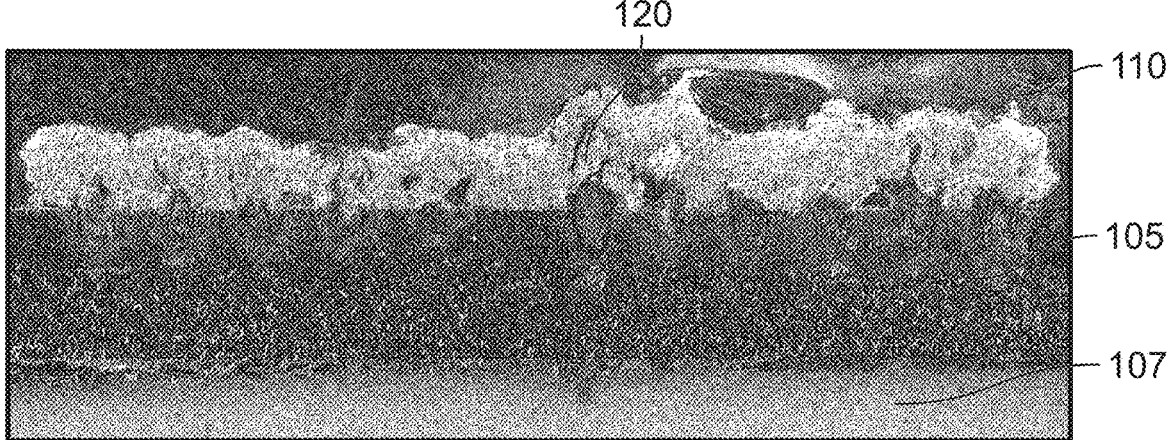
Figure 6F:
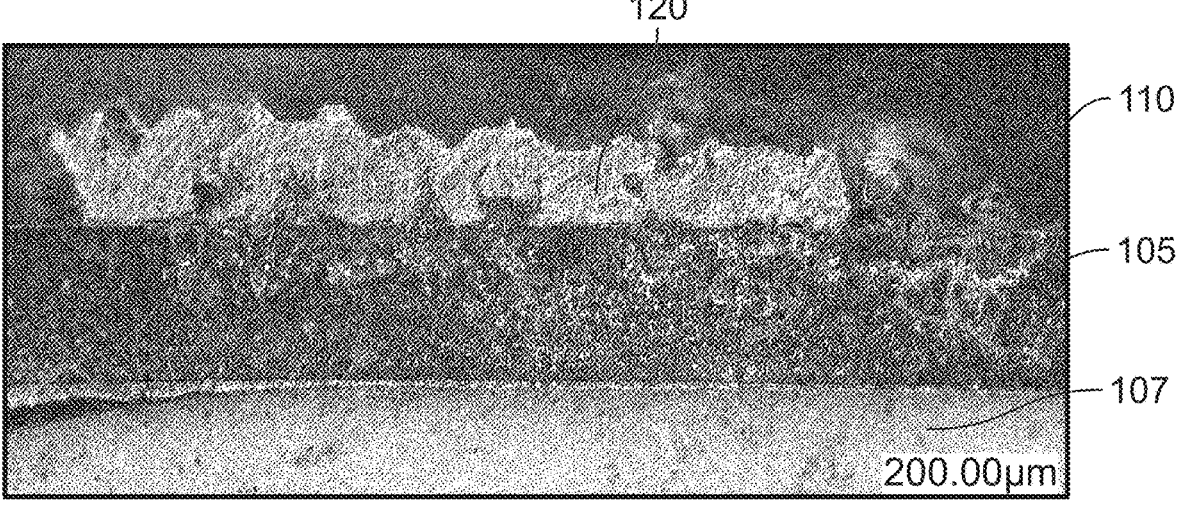
Figure 6G:
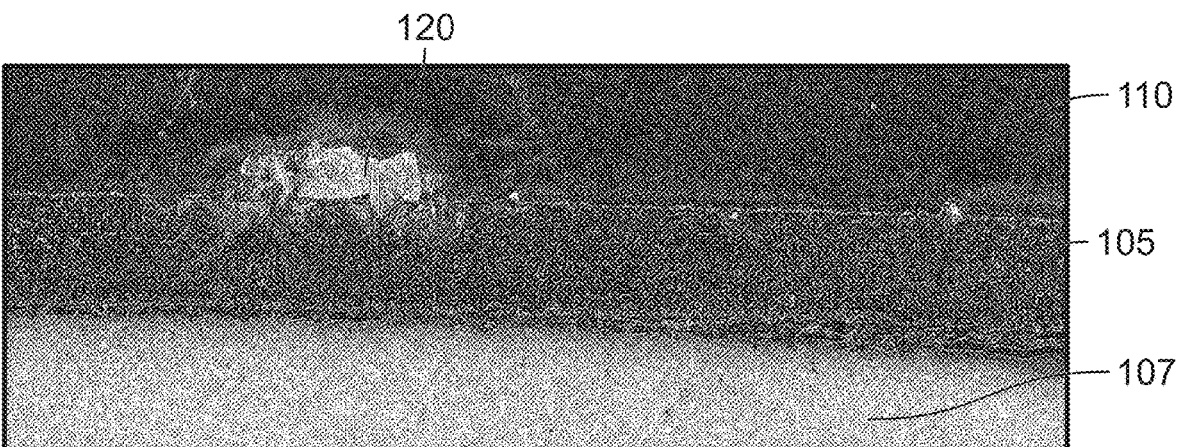
Figure 6H:
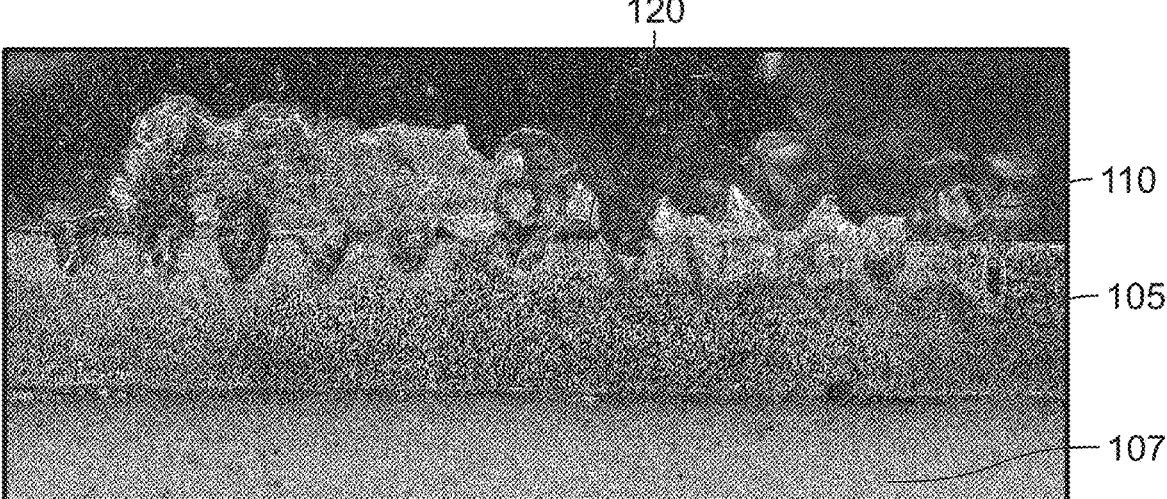
Figure 6I:
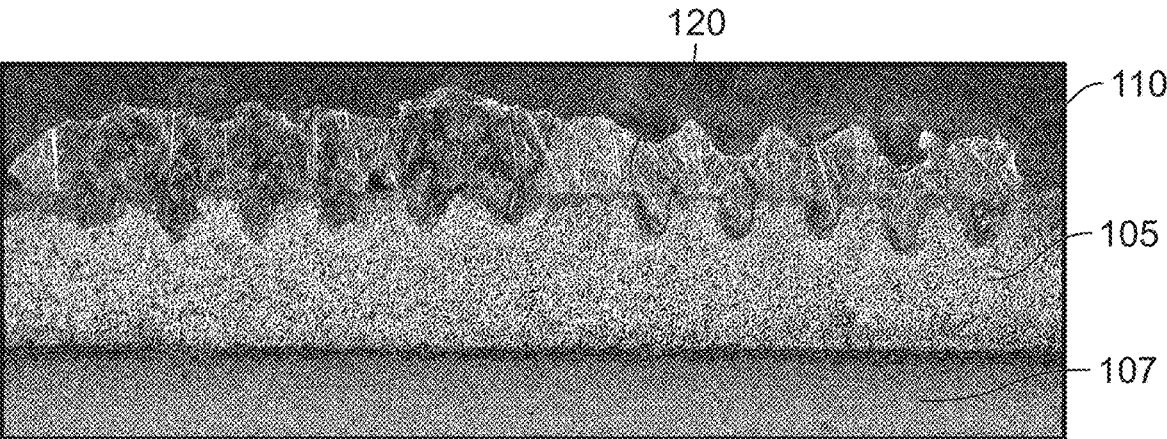

Turning now to FIGS. 4 and 5, example weld joints, e.g., for weld joints 114 and 116, respectively, are illustrated and described in further detail. More specifically, FIG. 4 illustrates an example weld joint 114 for a positive electrical contact 106 to a positive terminal 104 of a battery cell 102, while FIG. 5 illustrates an example weld joint 116 for a negative electrical contact 110 to a negative terminal 105 of a battery cell 102.

As illustrated in each of FIGS. 4 and 5, in example approaches a weld zone or joint 114/116 includes a plurality of micro welds 120. As will be discussed further below, each of the micro welds 120 extends in a line segment 123. Each of the micro welds 120 is separated from an adjacent micro weld 120, such that a weld-free zone 122 extends about an entire perimeter of each of the micro welds 120. The weld-free zone 122 therefore surrounds the micro weld 120. For example, as seen in FIGS. 4 and 5, when viewed from above, the micro welds 120 are each surrounded by the weld-free zone 122. In this manner, undesirable spike or "keyhole" shaped welds may be generally avoided, e.g., by avoiding concentrations of weld power as a laser weld beam transitions to a different direction. In other words, limiting welds within the weld joints 114 and/or 116 to line segments 123 provided by the micro welds 120 may prevent a weld laser from slowing around curves in a weld path and overheating material in the joints 114 and/or 116. As a result, in contrast to previous approaches where material in a weld joint could risk being overheated, the separated line segments 123 of the micro welds 120 illustrated may advantageously form relatively shallow or conduction welds, which offer improved strength in comparison to deeper, narrower keyhole welds, as discussed further below. The example micro welds 120 may be line segments 123 that are relatively small in length and width, thereby allowing weld laser power to be applied in a relatively small area such as the shoulder area 111 of a battery cell 102 to form a relatively strong conduction weld.

In the example weld joint 114 shown in FIG. 4, a plurality of line segments 123 of the micro welds 120 are arranged substantially parallel to each other in a generally square or rectangular joint. The line segments 123 of the micro welds 120 of the weld joint 114 may be perpendicular with respect to a path 132a taken by a weld laser used to form the micro welds 120. By contrast, the weld joint 116 illustrated in FIG. 5 extends along a generally curved interface, e.g., between a shoulder area 111 of the battery cell 102 and associated electrical contact 110 of the battery pack 100.

As illustrated, the weld joint 116 includes twelve (12) separated micro welds 120a-1 (collectively, 120) that are formed in respectively line segments 123a-1 (collectively, 123). The line segments 123 are arranged on the shoulder area 111 of the battery cell 102 such that they are offset longitudinally from each other, or offset in a direction perpendicular to the lateral spacing of the micro welds 120. The lateral spacing between the line segments 123 may be defined by a distance D. The distance D may be predetermined, e.g., based upon a desired spacing between micro welds 120. Each of the line segments 123 may extend between a radially outer (with respect to the shoulder area 111 of the battery cell 102) endpoint 121a to a radially inner endpoint 121b. Additionally, one or both ends of a micro weld 120 may be longitudinally offset from a laterally adjacent micro weld 120. As a result, the micro welds 120 are arranged within a generally parallelogram-shaped weld joint 116, with the radially outer endpoint 121a of each line segment 123 being offset longitudinally (i.e., in a direction parallel to the line segments 123) from the radially outer endpoints 121a of the adjacent line segment(s) 123. Similarly, the radially inner endpoint 121b of each line segment 123 is offset longitudinally from the radially inner endpoint 121b of adjacent line segment(s) 123. Accordingly, the radially outer endpoints 121a extend along a radially outer edge of the shoulder 111 of the battery cell 102. The radially inner endpoints 121b extend along the shoulder 111 at a position radially inward of the radially outer endpoints 121a.

As will be discussed further below, the line segments 123 of the micro welds may have a same length. In an example, each of the line segments 123 extend no further than 700 microns, corresponding to a radial width or assumed flat area of the shoulder area 111.

As noted above, it may generally be desirable to avoid spike or "keyhole" shaped welds, e.g., by avoiding extreme or localized concentrations of weld power from a laser weld beam. Accordingly, a power, speed, intensity, and/or other parameters of a laser welding device or beam may be adjusted to promote formation of relatively strong (in relation to spike/keyhole welds) conduction welds. In at least some example approaches, a speed of a laser along a weld joint may be between 500 millimeters per second (mm/s) and 3500 mm/s. In an example, the speed is 2040 mm/s.

Dimensions of the micro welds 120 may be any that are convenient. As noted above, in at least some example approaches where micro welds 120 are formed on a shoulder area 111 of a battery cell 102, an underlying substrate provided by the terminal 105 of the cell may be approximately 700 μm in width, and as such in these examples micro welds 120 may have a corresponding or similar length (e.g., a length of 700 μm). Additionally, as discussed herein micro welds 120 of the weld joint 116 may typically have a spacing or distance D separating each of the micro welds 120 of 100-400 μm; in an example the distance D is 250 μm. In some examples, a minimum peel strength associated with a weld joint 116 may be achieved, e.g., a peel strength of 7 Newtons (N).

The positioning of the micro welds 120 within the parallelogram-shaped weld joint 116 of FIG. 5 may be advantageous to the extent the underlying electrical terminal 105 of the battery cell 102 may be curved, e.g., as with the negative electrical contact 110 of the shoulder 111 of the battery cells 102 illustrated in FIGS. 1 and 3. For example, each of the micro welds 120 may be offset from adjacent micro welds 120 to provide the parallelogram shape. Further, each of the micro welds 120 may define an oblique angle relative to a path 132b of a weld laser used to form the micro welds 120. By contrast, in the example weld joint 114 illustrated in FIG. 4, both ends of each of the line segments 123 forming the micro welds 120 are aligned with the ends of the laterally adjacent micro weld(s) 120. Accordingly, the weld joint 114 defines a square or rectangular shape.

In at least some examples, weld joints such as the weld joints 114/116 illustrated in FIGS. 4 and 5 may be formed in a "middle-out" fashion, e.g., where a centrally disposed one of the micro welds 120 is formed initially, followed by additional micro welds 120 being formed on either side. Subsequently, further micro welds 120 may be formed in the weld joint on either side, in alternating fashion. In some examples, a first micro weld 120 of the weld joints 114/116 is formed in a center portion 150 of the weld joint 114/116, with subsequent micro welds 120 being formed in outer portions 152 or 154. Further, as indicated by the directional arrows illustrated in FIGS. 4 and 5 and discussed further below, in some examples micro welds 120 may be formed in a "zig-zag" pattern, e.g., where a first one of the welds 120 is formed using a laser traveling in a first direction, with a subsequent micro weld 120 formed with the laser traveling in a different or opposite direction as the first micro weld 120. Put another way, as illustrated in the example weld region 130a of FIG. 4, a first micro weld 120 may be formed starting at a first axis 140a and ending at a second axis 140b, with a second micro weld 120 formed starting at the second axis 140b and ending at the first axis 140a. Similarly, as illustrated in the example weld region 130b of FIG. 5, a first micro weld 120 may be formed starting at a first axis 142a and ending at a second axis 142b, with a second micro weld 120 formed starting at the second axis 142b and ending at the first axis 142a. Formation of welds 120 on alternating sides of a weld zone or region, and/or in a zig-zag pattern within the weld zone or region may spread heat due to welding, e.g., by a laser weld, outwardly from the center portion 150 to the outer portion(s) 152 and/or 154. Accordingly, localized or extreme concentrations of welding power due to energy intensity and duration (that might otherwise form spike or keyhole welds) are generally avoided by generally spreading weld formation, e.g., gradually outwardly from each side. This may be particularly beneficial where the weld joints 114/116 involved are relatively small, e.g., as illustrated in FIGS. 4 and 5. Merely by way of example, the weld regions 130 illustrated in FIGS. 4 and 5 each have an area that is no more than 7.5 square millimeters. More specifically, the weld joint 114 in FIG. 4 is approximately 1.5 millimeters wide and approximately 5 millimeters long. Each of the ten (10) separated micro welds 120 included in the weld joint of FIG. 4 are line-shaped and are approximately 1.5 mm wide. In the example illustrated in FIG. 5, the separated micro welds 120 of the weld joint 116 are each approximately 700 microns (0.7 mm) long, and in any case no longer than the 700 micron width of the shoulder area 111. Accordingly, the weld region 130b has a width of less than 1.0 millimeters, and extends approximately 2 millimeters along the weld path 132b. In an example, the length of the separated micro welds 120 corresponds to an underlying battery terminal substrate, e.g., of a shoulder area 111 of the battery cells 102 illustrated in FIGS. 1 and 2. While twelve (12) separated micro welds 120 are illustrated in the weld joint of FIG. 5, with weld-free zones 122 positioned around each of the welds 120, thereby surrounding the welds 120, any number of separated welds may be employed that is convenient. Merely by way of example, ten or eleven separated welds 120 may be employed. Further, as can be seen in the example weld region 130a of FIG. 4 and as mentioned above, in some examples welds 120 may extend at a perpendicular angle with respect to a welding path 132a. By contrast, in the example weld region 130b of FIG. 5, in other examples welds 120 may define an oblique angle (i.e., non-parallel and non-perpendicular) with respect to a welding path 132b.

As noted above, in the example weld joint 116 illustrated in FIG. 5, the micro welds 120 are each separated by a distance D. The distance D may be determined based upon a desired spacing of the micro welds 120, which may be dependent upon factors such as a ratio of a thickness of a superstrate (e.g., contact 110, see FIG. 3A/3B) to a substrate (e.g., terminal 105, see FIG. 3A/3B), a power of a weld laser, and/or a beam diameter of a weld laser. In an example, the distance D separating the micro welds 120 in FIG. 5 is 100-400 μm. In another example, the distance D is 250 μm. In this example, a superstrate of the weld joint 116 (e.g., contact 110) may be approximately half as thick as the underlying substrate (e.g., terminal 105). In another example, a superstrate/contact 110 has a thickness of 125 μm and the underlying substrate/terminal 105 has a thickness of 250 μm. Continuing with this example, a laser employed to weld the contact 110 to the terminal 105 is a foil welding laser. In this example a fiber laser is employed that is a class 4 continuous wave laser, e.g., with a maximum power output of 1200 Watts. In this example, the weld laser has a wavelength of 1070 nanometers (nm), although any other wavelength that is convenient may be employed. Focal length, beam size at a lens of the laser beam, and beam diameter at the workpiece may also be any value that is convenient. In an example, a focal length of 441.6 millimeters is used with a beam size at the lens of 15 millimeters (mm). The beam diameter at the workpiece (i.e., the superstrate/substrate) may typically be between 20 µm and 40 µm. In an example, the beam diameter is 31 µm. A power of the laser may also be adjusted during a welding process, e.g., to increase power for subsequent micro welds 120 being formed. For example, in the example weld joint 116 illustrated in FIG. 5, the micro weld 120a may be formed with a relatively reduced power level, with subsequent micro welds 120b, 120c, 120d, etc. being formed with a relatively greater power level. In some approaches, the relatively greater power level may be several multiples of the power level used to form the first micro weld 120a. The relatively greater power level may be, in some examples, thirty times greater than the power level used to form the first micro weld 120a.

Turning now to FIGS. 6A-6I, example welds of electrical contacts to electrical terminals are illustrated in section, e.g., as may be formed in electrical contacts 110 and underlying terminals 105 along the shoulder areas 111 of battery cells 102. As shown, the welds 120 are generally shallow such that they do not extend through a substrate (e.g., negative terminal 105). Accordingly, insulating material(s) 107 disposed beneath each micro weld 120 and the terminals are not damaged by the welding process. Further, as noted above the conduction or convection welds illustrated are relatively stronger than spike or keyhole welds.

Figure 7:
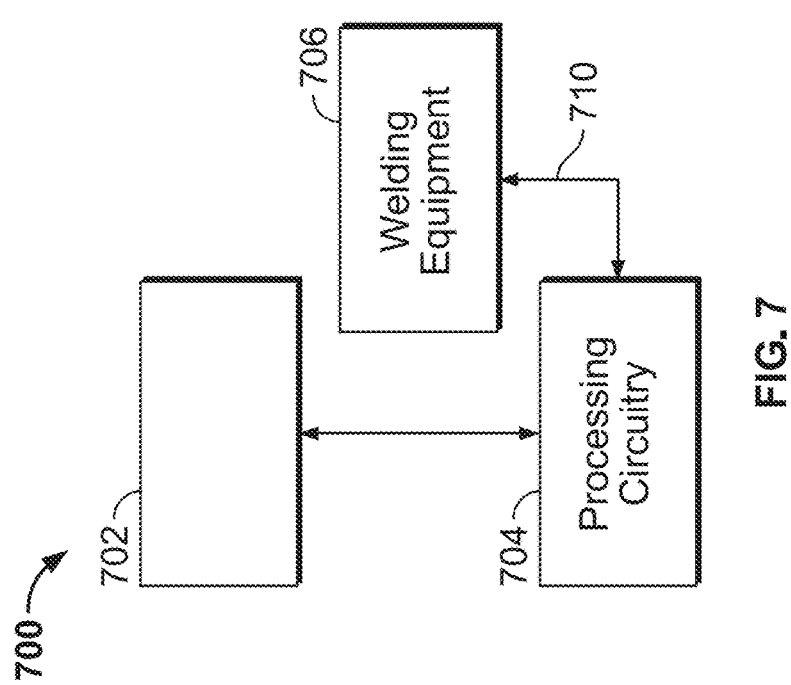
FIG. 7 shows an illustrative welding system, in accordance with some embodiments of the present disclosure.

Turning now to FIG. 7, an illustrative welding system 700 is illustrated, e.g., for welding battery cells and contacts together, in accordance with some embodiments of the present disclosure. Welding system 700 may include processing circuitry 704, which may include any suitable software, hardware, or both for guiding welding equipment 706. The processing circuitry 704 may provide information indicative of the location of any suitable components being micro welded such as those described above to guide welding equipment 706. For example, information indicative of the location of battery terminals, contacts, overlap areas between terminals and contacts, any suitable reference position features, etc. may be provided by the processing circuitry 704.

The processing circuitry 704 may be in communication with one or more sensors 702, which may include imaging equipment such as image sensors (e.g., photodetectors or cameras for detecting visible light or any other suitable photonic signal), lidar equipment, proximity sensors, doppler-based equipment, any other suitable sensor or imaging equipment for determining a position for a weld joint, or any combination thereof.

Processing circuitry 704 includes any suitable software, hardware, or both generate a welding control signal 710. The control signal 710 may include, for example, a weld path, signals indicating when the laser should be turned on, a power level of the laser, etc. Welding control signal 710 is communicated to welding equipment 706, using any suitable hardware and communications protocol (e.g., wired, wireless, or optical communication). Processing circuitry 704 may include, for example, one or more computing devices having one or more processors capable of executing instructions based on inputs. For example, processing circuitry 704 may include a computer, mobile/tablet computing device, an embedded system, any other suitable computing device, or any combination thereof having instructions programmed thereon in order determine where a weld on a battery cell should be located. Such processing may include any suitable computer vision techniques, for example.

Welding equipment 706 includes any suitable hardware, software, or both for performing welding operations in response to, and in accordance with, welding control signal 710. Example welding equipment may include laser welding equipment configured to generate a beam for propagating a micro weld, e.g., micro welds 120. However, other welding equipment may be used, e.g., metal welding equipment, any other suitable welding equipment, or any combination thereof. Processing circuitry 704 may provide information directly to welding equipment 706 to allow welding equipment 706 to, for example refine locations for placement of welds. Welding equipment 706 may include any suitable automated movement/robotic equipment for moving appropriate devices to make desired welds. Instructions given to cause a laser to follow a path for form micro welds 120 may include, merely by way of example, instructions for a starting point for a laser where a micro weld 120 is initiated (e.g., an endpoint 121), a length of a line segment 123 of the micro weld 120 to be formed by the laser, or an endpoint 121 of the micro weld 120. Instructions may also include a spacing of laterally adjacent micro welds 120, e.g., a distance D between micro welds 120. Furthermore, instructions may include an order for forming micro welds 120, e.g., a location of a first micro weld 120 and subsequent micro welds 120.

Figure 8:
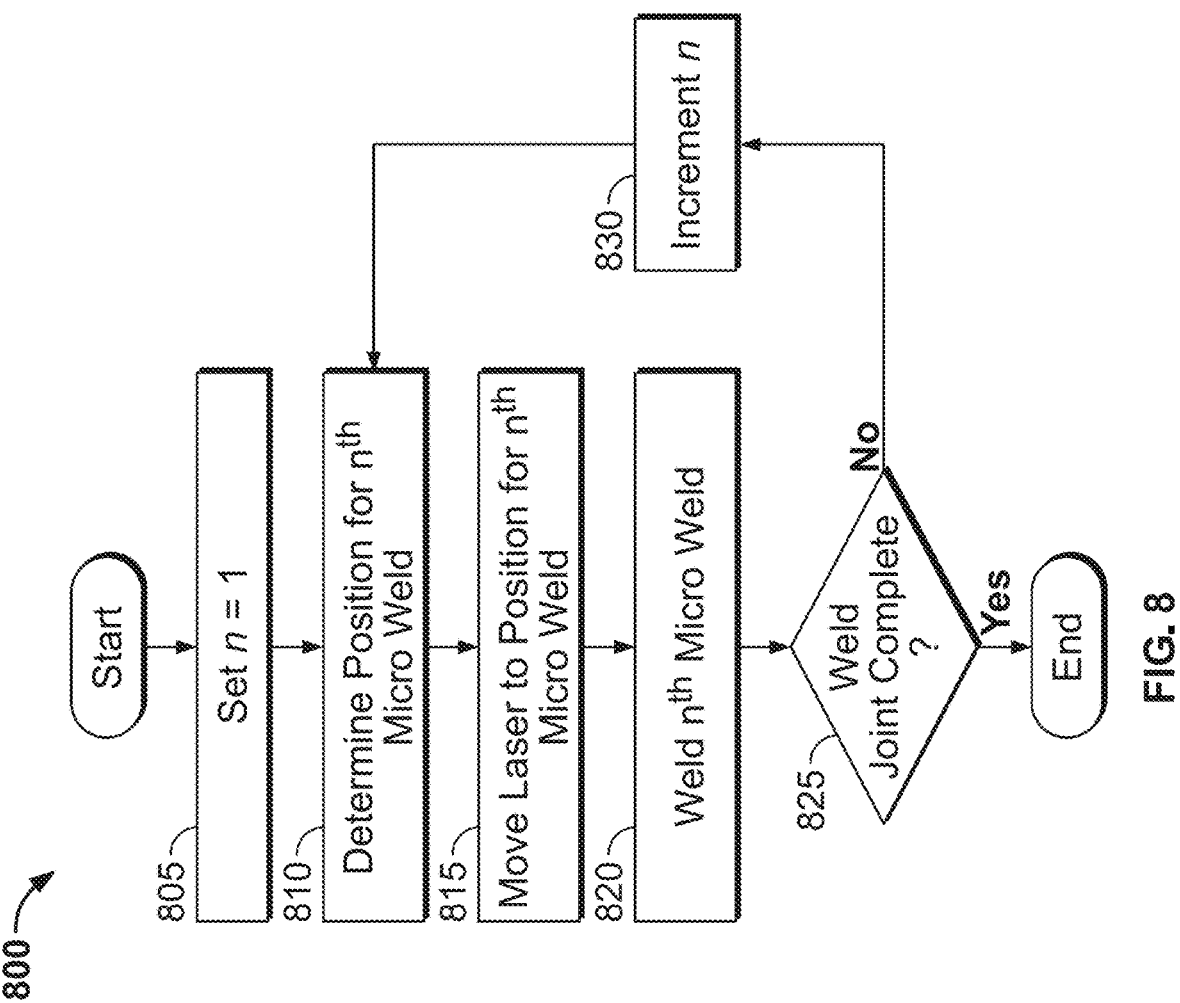
FIG. 8 shows a flowchart of an illustrative process for welding an electrical contact to a substrate, according to some embodiments of the disclosure.

Turning now to FIG. 8, an example process 800 for welding one or more weld zones is illustrated and described in further detail. In an example, process 800 may be executed by processing circuitry 704 or welding equipment 706.

Process 800 may begin at block 805, in which a counting variable is used to form micro welds. Generally, process 800 may form a first micro weld, and continue to form additional micro welds up to a desired number n of micro welds. Process 800 may initially set the counting variable n to the integer one (1). Process 800 may then proceed to block 810.

At block 810, process 800 may determine a location or position for the nth micro weld. As noted above, in some example approaches a first micro weld 120 of a weld joint is initiated in a middle or center region, e.g., center portion 150 of weld joint 116, with subsequent micro welds being initiated on either side of the first micro weld 120 in alternating manner. Process 800 may then proceed to block 815.

At block 815, a laser may be moved to a position to form the nth micro weld. For example, a laser may be moved to a desired position as determined at block 810. In some examples, a laser is moved to a shoulder, e.g., of a cylindrical battery cell. In another example, a laser is moved to a first portion of the battery cell 102 to micro-weld a first line segment.

Proceeding to block 820, process 800 may initiate welding of the nth weld of a selected weld zone. In at least some examples, the processing circuitry 704 generates a welding control signal based on the selected weld zone. In some embodiments, the welding control signal includes an analog signal. For example, a voltage, current, frequency or other suitable characteristic of the welding control signal may indicate one or more welding parameters (e.g., current flow, duration, or other suitable parameter). In some embodiments, the welding control signal includes a digital signal. For example, the welding control signal may include a message, value, set of values, or other suitable information that indicates one or more welding parameters (e.g., current flow, duration, or other suitable parameter). The processing circuitry 704 may also communicate the welding control signal to welding equipment 706, causing the welding equipment 706 to perform the weld, e.g., as a micro weld 120. The processing circuitry 704 may generate and transmit the welding control signal using any suitable communications network (e.g., wired, wireless, or optical) and protocol.

As discussed above, in some example approaches a micro weld 120 is initiated with a weld-free zone 122 surrounding the micro weld 120. As noted above, in some examples the weld-free zone may extend about a perimeter, e.g., an entire perimeter, of the micro weld 120. The micro weld 120, as noted above, may be elongated, or may be formed in a line such that once the micro weld 120 is formed the micro weld 120 is surrounded by the weld-free zone 122. Merely as one example, as noted above an example micro weld 120 may extend across a relatively narrow shoulder area 111 of a battery cell 102, e.g., having a width of approximately 700 microns. Further, application of the micro weld 120 in a line may be a conduction weld and may avoid over-penetration of the weld zone or formation of a "keyhole" weld. Accordingly, a depth of the weld may be less than a maximum thickness of a terminal substrate of the weld, e.g., an underlying contact of a battery cell 102. Avoiding over-penetration of the weld joint with the micro weld 120 may reduce or eliminate damage to an underlying insulation of the cell 102, e.g., insulating material 107 as discussed above.

Process 800 may then proceed to block 825, where process 800 queries whether the weld zone has been completed. In examples where a plurality of welds 120 are formed, e.g., weld joints 116, after formation of the first micro weld 120 process 800 will proceed to block 830, where the counting variable n is incremented, and may then proceed to block 810. Accordingly, process 800 may determine a position and initiate each subsequent micro weld 120, e.g., a second micro weld, a third micro weld, fourth, etc., to a desired number of micro welds n.

It should be noted that subsequent welds 120 formed in a weld joint, e.g., weld joint 116, may be positioned and initiated in any manner convenient. As noted above, in some example approaches an initial micro weld 120 is formed in a middle or generally central portion of the weld joint 116, with subsequent welds 120 being formed on either side of the first micro weld 120 in alternating fashion. Each subsequent micro weld 120 may be formed with a respective weld-free zone 122 surrounding the micro weld 120, respectively. In some examples, a plurality of micro welds 120 may be formed that are laterally adjacent and spaced apart by their respective weld-free zones 122. Further, in some examples micro welds 120 may be longitudinally offset relative to their adjacent micro weld 120. The longitudinal offset of micro welds 120 may facilitate weld joints 114 and/or 116 along non-straight surfaces, e.g., a curved or rounded surface, or to provide a parallelogram shape such as illustrated above in FIG. 5. Longitudinally offset micro welds 120 may be convenient for substrates having a curved surface, e.g., a shoulder area 111 of a cylindrical cell 102. Other shapes of a weld zone are possible, e.g., a generally rectangular shape as illustrated above in FIG. 4, a square shape, etc.

Process 800 may determine the weld zone is complete at block 830 based on, merely by way of example, that a desired number of welds x for a given weld zone is equal to the counting integer n. Process 800 may then terminate.

It should be noted that process 800 may be employed in the context of a welding process of a battery pack where multiple positive contacts/terminals are micro welded together in multiple passes, and multiple negative contacts/terminals are micro welded together in multiple passes. For example, as detailed above in an example welding process a first pass may initiate a laser weld on a first side of a row of positive terminals 104 and associated positive contacts 106. A second pass of the laser may subsequently initiate a laser weld at another location on each of the positive terminals 104/positive contacts 106. Negative contacts and terminals may be joined in similar multiple-pass fashion. More specifically, as also noted above a first pass may initiate a laser weld on a first side of a row of negative terminals 105 and associated negative contacts 110. A second pass of the laser may subsequently initiate a laser weld at another location on each of the negative terminals 105/negative contacts 110.

Referring again to FIGS. 5 and 8, an example implementation of process 800 for forming the example weld joint 116 illustrated in FIG. 5 is described in further detail. As noted above, the example weld joint 116 illustrated in FIG. 5 includes twelve (12) distinct micro welds 120a-1 formed with distinct line segments 123a-1, respectively. Each of the segments 123 extend between respective radially outer endpoints 121a and radially inner endpoints 121b. As also noted above, the weld joint 116 and each of the micro welds 120 thereof may be positioned on a shoulder of a battery cell, e.g., in different portions 150, 152, 154 of the cylindrical battery cell 102. Accordingly, a desired number of micro welds x may be set to 12. As noted above, initially process 800 may set the counting integer n to the integer one.

Proceeding to block 810, a position for the nth/first micro weld, i.e., micro weld 120a, is determined. As noted above, the micro welds 120 may each be formed as line segments 123 and may be formed in an order such that one or more centrally disposed micro weld(s), e.g., micro weld 120a, is/are formed initially within a center portion 150 of the weld joint 116. Subsequently, additional micro welds 120 may be formed on each side of the initial micro weld 120a and in different portions 152/154, e.g., by alternating between different sides of the initial micro weld 120a, and/or between the different portions 152/154 of the battery cell 102. Accordingly, at block 810 process 800 may determine a beginning location corresponding to the micro weld 120a, e.g., a radially outer endpoint 121a of the line segment 123a.

Proceeding to block 815, the weld laser, e.g., of welding equipment 706, may be moved to the position determined at block 810. Accordingly, process 800 may move the weld laser to the radially outer endpoint 121a of line segment 123a. At block 820, process 820 may turn on the laser, and form micro weld 120a by moving the laser from the endpoint 121a along the first line segment 123a to endpoint 121b. The laser may be turned off when the endpoint 121b is reached by the laser to complete the micro weld 120a. Additionally, as noted above the micro weld 120a may be formed with a weld-free zone 122a that extends about a perimeter or surrounds the micro weld 120a. Process 800 may then proceed to block 825.

At block 825, process 800 queries whether the weld joint 116 is complete. As additional micro welds 120 remain to be formed, i.e., micro welds 120b-1, process 800 then proceeds to block 830, where the counting integer n is incremented, i.e., to two (2). Process 800 then proceeds to block 810.

At block 810, process 800 determines a position for the second (i.e., n=2) micro weld 120b. The micro weld 120b, as noted above, may be formed as a line segment 123b extending between a radially outer endpoint 121a and a radially inner endpoint 121b thereof. The line segment 123b is in a different portion of the battery cell, i.e., in portion 154. Further, in this example the micro weld 120b is formed in an opposite direction to the previous micro weld 120a, i.e., by moving the laser from the radially inner endpoint 121b of the micro weld 120b to the radially outer endpoint 121a, although other directions or approaches are possible. Accordingly, the position may be determined at block 810 to be the radially inner endpoint 121b of the micro weld 120b.

Proceeding to block 815, the laser may be moved to the position determined at block 810. The laser may therefore be moved, e.g., by a distance D, in response to being turned off, i.e., upon completing the previous micro weld 120a. As noted above, the micro weld 120b may be spaced from micro weld 120a by the distance D. Accordingly, movement of the weld laser of welding equipment 706 at block 815 may include moving the laser the distance D, e.g., from radially inner endpoint 121b of line segment 123a to the radially inner endpoint 121b of the line segment 123b. The micro weld 120a is positioned in the center portion 150 of the weld joint 116 on the battery cell 102, as noted above, and as such the laser may be moved from the portion 150 to a different portion 154 of the battery cell 102 to the line segment 123b. Accordingly, movement of the laser may in some examples cause the laser to move between different portions of the battery cell 102 when forming different micro welds 120.

In response to the movement of the weld laser of welding equipment 706 to the determined position, e.g., by moving the laser the distance D, process 800 may proceed to micro weld the line segment 123b at block 820. For example, with the weld laser positioned at the radially inner endpoint 121b of line segment 123b, the weld laser may be turned on, and subsequently moved along the line segment 123b. The weld laser may be turned off when the radially outer endpoint 121a of the line segment 123b is reached, resulting in the formation of micro weld 120b. Further, weld-free zone 122b may remain which surrounds the line segment 123b/micro weld 120b. Process 800 may then proceed to block 825.

At block 825, process 800 determines that the weld joint is not complete, as micro welds 120c-1 remain to be formed. Accordingly, process 800 proceeds to block 830 to increment n, and then to block 810.

At block 810, process 800 determines a position for the third (i.e., n=3) micro weld 120c. The micro weld 120c, as noted above, may be formed as a line segment 123c extending between a radially outer endpoint 121a and a radially inner endpoint 121b thereof. In this example, the micro weld 120c is formed in an opposite direction to the previous micro weld 120b, i.e., by moving the laser from the radially outer endpoint 121a of the line segment 123c to the radially inner endpoint 121b. Further, the direction of movement of the weld laser in forming micro weld 120c may be the same, i.e., radially inwardly along the shoulder of the battery cell 102, as for micro weld 120a. Other directions or approaches are possible. Accordingly, the position may be determined at block 810 to be the radially outer endpoint 121a of the line segment 123c.

Proceeding to block 815, the laser may be moved to the position determined at block 810. As noted above, the micro weld 120c may be spaced from micro weld 120a by a distance D, and may be positioned on an opposite side of the micro weld 120a than the micro weld 120b. Accordingly, movement of the weld laser of welding equipment 706 at block 815 may include moving the laser a multiple of the distance D, e.g., twice the distance D, corresponding to a distance from radially outer endpoint 121a of line segment 123b to the radially outer endpoint 121a of the line segment 123c. The line segment 123c is illustrated as being positioned in a different portion 152 of the battery cell 102 than the micro weld 120a (which is within the center portion 150) and micro weld 120b (which is within the portion 154). Accordingly, the weld laser may be moved from the portion 154 of the battery cell 102 to a different portion, i.e., portion 152 at block 815.

In response to the movement of the weld laser of welding equipment 706 to the determined position, e.g., by moving the laser to the radially outer endpoint 121a of line segment 123c, process 800 may proceed to micro weld the line segment 123c at block 820. For example, with the weld laser positioned at the radially outer endpoint 121a of line segment 123c, the weld laser may be turned on, and subsequently moved along the line segment 123c to the radially inner endpoint 121b. The weld laser may be turned off when the radially inner endpoint 121b of the line segment 123c is reached, resulting in the formation of micro weld 120c. Further, weld-free zone 122c may remain which surrounds the line segment 123c/micro weld 120c. As noted above, the second-formed micro weld 120b and third-formed micro weld 120c are on opposite lateral sides of the first-formed micro weld 120a, and accordingly the line segments 123b and 123c are also on opposite lateral sides of the line segment 123a of the first-formed micro weld 120a. Process 800 may then proceed to block 825.

At block 825, process 800 determines that the weld joint is not complete, as micro welds 120d-1 remain to be formed. Accordingly, process 800 proceeds to block 830 to increment n, and then to block 810.

Process 800 may continue to cycle through blocks 810-830 to form the fourth micro weld 120d, fifth micro weld 120e, etc. along their respective line segments 123 illustrated in FIG. 5. Process 800 may eventually form the twelfth micro weld 1201, with the counting integer n advanced to the integer twelve (12). Accordingly, process 800 may determine at block 825 that the weld joint 16 is complete, as the counting integer n is equal to the desired number of micro welds x. As noted above, in other example approaches a different number of micro welds 120 may be implemented to create a weld joint, e.g., between a contact and a shoulder of battery cell 102.

As noted above, in the example weld joint 116 each of the line segments 123 of the micro welds 120 extend parallel to each other. Further, the line segments 123 are each laterally spaced apart by a same distance D, extending in a direction perpendicular to the first line segment 123a. Further, as noted above in the example illustrated in FIG. 5, a length of each of the line segments 123 of the micro welds 120 in the weld joint 116 are no more than 700 microns.

The foregoing description includes exemplary embodiments in accordance with the present disclosure. These examples are provided for purposes of illustration only, and not for purposes of limitation. It will be understood that the present disclosure may be implemented in forms different from those explicitly described and depicted herein and that various modifications, optimizations, and variations may be implemented by a person of ordinary skill in the present art, consistent with the following claims.

What is claimed is:

1. A method, comprising:

moving a laser to a shoulder of a battery cell;

micro welding with the laser a first line segment on the shoulder of the battery cell;

micro welding with the laser a second line segment on the shoulder of the battery cell; and micro welding with the laser a third line segment on the shoulder, wherein:

the first, second, and third line segments are laterally adjacent to each other and equally spaced apart.

2. The method of claim 1, further comprising:

turning the laser on to micro weld the first line segment;

moving the laser a predetermined distance on the shoulder of the battery cell;

turning the laser off before moving the laser the predetermined distance; and turning the laser on to micro weld the second line segment in response to moving the laser the predetermined distance.

3. The method of claim 2, further comprising:

turning the laser off after micro welding the second line segment;

moving the laser a multiple of the predetermined distance from the second line segment in response to turning the laser off;

turning the laser on to micro weld the third line segment in response to moving the laser the multiple of the predetermined distance.

4. The method of claim 1, further comprising:

moving the laser to a first portion of the battery cell to micro weld the first line segment; and moving to a second portion of the battery cell to micro-weld the second line segment.

5. The method of claim 4, further comprising:

moving the laser from the second portion to a third portion of the battery cell; and in response to moving the laser from the second portion to the third portion, micro welding the third line segment.

6. The method of claim 5, wherein the second line segment and the third line segment are on opposite lateral sides of the first line segment.

7. The method of claim 6, wherein the first line segment is formed in a center portion of a weld joint.

8. The method of claim 1, wherein the first and second line segments create a weld joint between a contact and the shoulder of the battery cell.

9. The method of claim 1, further comprising:

forming a first weld-free zone surrounding the first line segment; and forming a second weld-free zone surrounding the second line segment.

10. The method of claim 1, wherein a length of each of the first line segment and the second line segment is no more than 700 microns, and wherein the second line segment is parallel to the first line segment.

11. The method of claim 1, wherein the battery cell is generally cylindrical.

12. A battery cell assembly, comprising:

a battery cell;

a weld joint on a shoulder of the battery cell, wherein the weld joint comprises a first micro weld line segment, a second micro weld line segment, and a third micro weld line segment, wherein the first micro weld line segment, second micro weld line segment, and third micro weld line segment are laterally adjacent to each other and equally spaced apart.

13. The battery cell of claim 12, wherein a length of each of the first micro weld line segment and the second micro weld line segment is no more than 700 microns.

14. The battery cell of claim 12, wherein the first micro weld line segment, the second micro weld line segment, and the third micro weld line segment are parallel to each other.

15. A battery pack, comprising:

a plurality of battery cells;

a plurality of weld joints, each battery cell having one of the weld joints on a shoulder of the battery cell, respectively, each weld joint comprising a first micro weld line segment, a second micro weld line segment, and a third micro weld line segment, wherein the first micro weld line segment, second micro weld line segment, and third micro weld line segment are laterally adjacent to each other and equally spaced apart.

16. The battery pack of claim 15, wherein a length of each of the first micro weld line segment and the second micro weld line segment is no more than 700 microns.

17. The battery pack of claim 15, wherein the first micro weld line segment, the second micro weld line segment, and the third micro weld line segment are parallel to each other.

18. The battery pack of claim 15, wherein the first micro weld line segment of each of the weld joints are arranged parallel to the second micro weld line segment of the weld joint, respectively.

19. The battery pack of claim 15, further comprising a negative electrical contact joined to the battery cells with the weld joints.

20. The method of claim 1, wherein:

the second line segment is micro welded subsequent to micro welding the first line segment;

the third line segment is micro welded subsequent to micro welding the second line segment; and the second line segment and the third line segment are on opposite lateral sides of the first line segment.

* * * * *